United States Patent [19]

Riessland et al.

[11] 4,311,959
[45] Jan. 19, 1982

[54] CAPACITIVE MEASURING SENSOR

[76] Inventors: Eberhard Riessland, Dr.-Karl-Rüdrich-Strasse 34, DDR-801 Dresden; Wolfgang Wagner, Wittenberger Strasse 33, DDR-8019 Dresden; Günter Opitz, Hölderlinstrasse 9, DDR-8122 Radebeul, all of German Democratic Rep.

[21] Appl. No.: 48,354

[22] Filed: Jun. 14, 1979

[30] Foreign Application Priority Data

Jun. 20, 1978 [DD] German Democratic Rep. ... 206138

[51] Int. Cl.³ .......................................... G01R 27/26
[52] U.S. Cl. .................................................. 324/61 P
[58] Field of Search ............................ 324/61 P, 61 R

[56] References Cited

U.S. PATENT DOCUMENTS

| | | | |
|---|---|---|---|
| 2,800,628 | 7/1957 | Stinson et al. | 324/61 R |
| 2,802,178 | 8/1957 | Shafer et al. | 324/61 R |
| 3,019,651 | 2/1962 | Hermanson | 324/61 P |
| 3,084,558 | 4/1963 | Wilcox et al. | 324/61 P |
| 3,119,266 | 1/1964 | Atkinson | 324/61 P |
| 3,400,331 | 9/1968 | Harris | 324/61 R |
| 3,515,987 | 6/1970 | Zurbrick et al. | 324/61 R |
| 3,716,782 | 2/1973 | Henry | 324/61 R |
| 3,801,900 | 4/1974 | Szasz | 324/61 R |
| 3,805,150 | 4/1974 | Abbe | 324/61 R |
| 3,986,109 | 10/1976 | Poduje | 324/61 R |

*Primary Examiner*—Stanley T. Krawczewicz
*Attorney, Agent, or Firm*—Michael J. Striker

[57] ABSTRACT

The invention relates to capacitive probe with a special shielding, in order to be able to measure small differences in distance which correspond to small differences in capacitance.

For this purpose, a first and a second electrode are located within a shield which is connected to the ground potential.

A coupling pin is located within an opening of the first electrode and, in a given instance, within a recess. A dielectric is placed between the shield, the electrodes and coupling pin, and the dielectric may be divided. The electrodes shield the coupling pin from the shield. The shield has a decoupling projection between the first and second electrodes, so that the capacitances between the first and second electrodes (as well as the capacitance between the shield and the coupling pin) are very small.

With the capacitive measuring probe, distances to a conductive material are measured, as well as the position of the bordering edges of the conductive material.

7 Claims, 5 Drawing Figures

CAPACITIVE MEASURING SENSOR

BACKGROUND OF THE INVENTION

1. Field of the Invention

The invention relates to a capacitive measuring sensor for the measuring of distances between the capacitive measuring sensor and a conductive material. Herein, the capacitive measuring sensor will register steady changes in thickness as well as the position of the edges forming the borders of the conductive material.

2. Description of the Prior Art

The West German Auslegeschrift No. 24 48 205, describes a capacitive sensor for a filling-level gauge, in which a probe electrode reaches into the space to be gauged. By the material filled in, the field of the probe electrode is deformed relative to its state without filled material. The relations of capacitances are changed thereby and are displayed in an evaluating circuit. Due to insufficient shielding, the capacitive probe is unsuitable for the gauging of smaller distances between the probe electrode.

A special shielding device for multiple-track magnetic heads, during signal recording and/or reproduction is described in the East German Pat. No. 129 940. The shielding there consists of a combination of electrically conductive and non-conductive strata, forming the shielding plates, and of a field-deformation plate, common to all magnet systems. The shielding plates are located herein between the individual magnet systems and increase the crosstalk attenuation.

It would be advantageous to create a capacitive measuring sensor, suitable for the recognition and pick-up of small capacitive differences between the capacitive measuring sensor and a conductive material. The measuring sensor should also be of simple construction and should have a small measuring area.

SUMMARY OF THE INVENTION

In this invention interference capacitances to ground, and interfering coupling capacitances are nearly completely suppressed by special shielding inherent in its construction, thus enabling the measurement of the smallest capacitances.

The capacitive measuring sensor as per invention, consists of a grounded shield in the shape of a hollow shell closed at the top. A first electrode is located within the shield flush with the bottom of the shield. A coupling pin with a measuring surface is arranged in an opening of the first electrode and, in given instances, in a recess of the second electrode, the measuring surface being flush here with the shield and the first electrode. The space between the shield, the electrodes and the coupling pin is filled with a dielectric material. The wall thickness between the individual electrically conductive parts is constant. An amplifier element is provided within the shield and above the second electrode.

The first electrode is connected to the input through a first bore of the shield, the second electrode being connected with the amplifier input and the amplifier output with the output of the capacitive measuring sensor through a second bore of the shield.

It is advantageous if the amplifier element is a field effect transistor with its gate forming the amplifier input and its drain the amplifier output, its source being connected to the shield. Between the electrodes, the shield is provided with a decoupling projection. By this, a reduction of the interferance coupling between the electrodes is achieved.

It is also advantageous if the measuring surface projects somewhat from the area formed by the shield and the first electrode. This will avoid short circuits between the other conductive parts if the measuring surface of the coupling pin, (which is insulated on all sides) should come into contact with the conductive material.

The measuring sensor may be of a special shape for various measuring methods. If the distance is to be measured, it is favorable to have a circular cross section for the shield. For the determination of the position of the edges forming the borders of the conductive material, a rectangular cross section of the shield will be favorable.

By varying the distance, the capacitances between the shield, the first electrode and the coupling pin will change. On applying an alternating voltage to the input, an output alternating voltage will be present at the output and will depend upon the distance between the measuring surface of the coupling pin and the conductive material.

BRIEF DESCRIPTION OF THE DRAWINGS

The invention is explained more closely using an example of preferred embodiments and drawings.

DETAILED DESCRIPTION OF PREFERRED EMBODIMENTS

The capacitive measuring sensor serves for the measuring of the distance $d_1$ of a conductive material 2, or also for the determination of the position of the edges forming the border of the conducive material 2.

Figure 1:
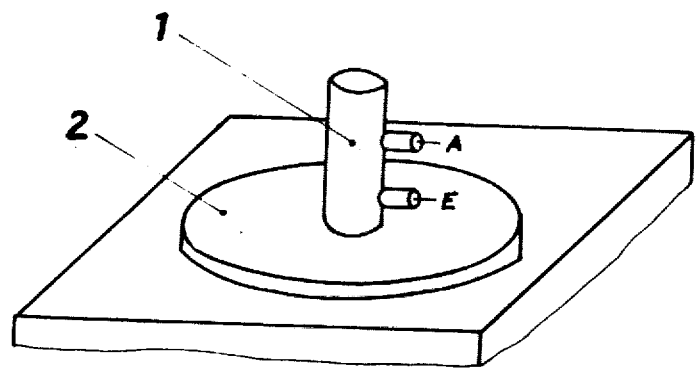
FIG. 1 shows the invention used to measure distance to a conductive material.
Figure 4:
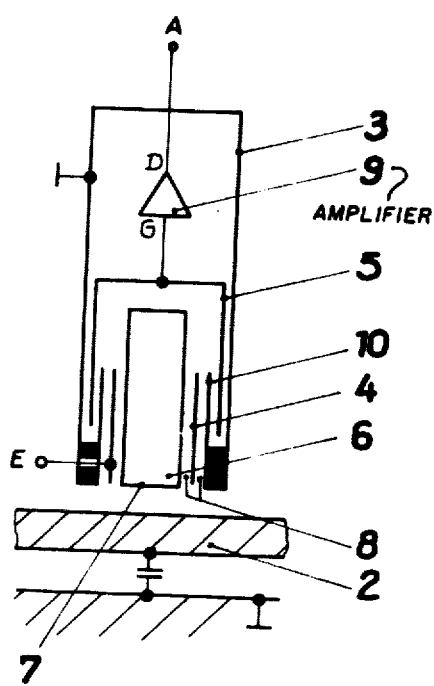
FIGS. 4 and 5 show, respectively, second and third embodiments of the invention.
Figure 5:
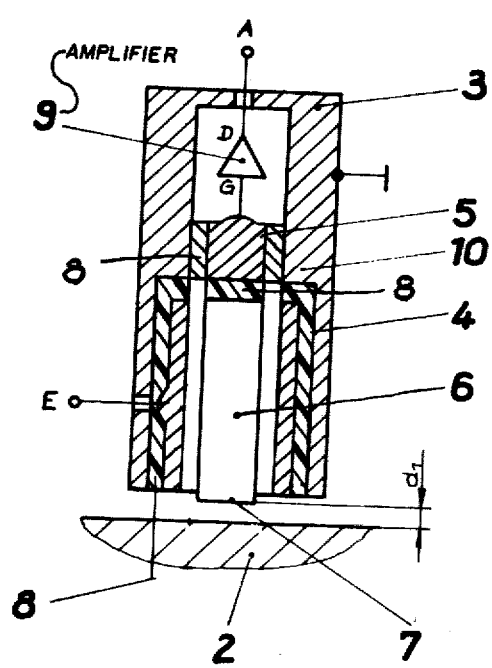

FIG. 1 shows the measuring arrangement, using the capacitive measuring sensor 1.

Figure 2:
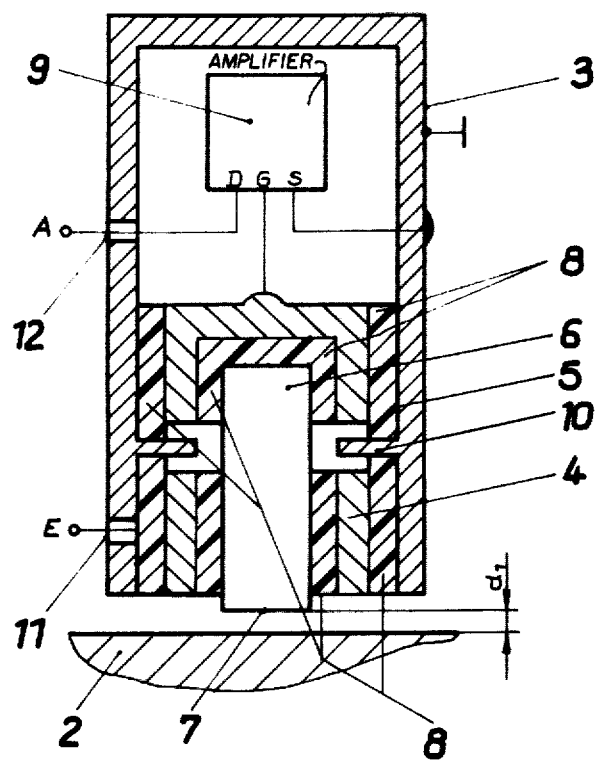
FIG. 2 shows a cross-sectional elevation of the invention.

As per FIG. 2, the capacitive measuring sensor 1 consists of a grounded shield 3 in the shape of a hollow shell which is closed at the top. A first electrode 4 is located within the shield 3. A coupling pin 6 with a measuring surface 7 is located in an opening of the electrode 4 and within a recess of the second electrode 5. The measuring surface 7 projects somewhat below the lower end of the first shield 3 and the electrode 4, in order to prevent short circuits between the conductive parts if the device is lowered onto the conductive material 2.

The space between the shield 3, the first and second electrode 4 and 5 and the coupling pin 6 is filled herein with a dielectric of a low dielectric 8 constant, whereby the parts are galvanically insulated from each other. The wall thickness of the dielectric 8 between the individual parts is preferably constant.

An amplifier element 9 is located within the shield 3 and above the second electrode 5. Advantageously, amplifier element 9 may be a field effect transistor, with its gate serving as an input, its drain serving as an output, and its source being grounded via shield 3. Between the first and second electrodes 4 and 5, the shield 3 is provided with a decoupling projection 10, by which interference coupling between the electrodes is reduced.

The first electrode 4 is connected to the input E through a first bore 11 in the shield 3, the second electrode 5 is connected to the gate of amplifier 9, and the drain of amplifier is connected to output A through a second bore 12 in the shield 3.

Figure 3:
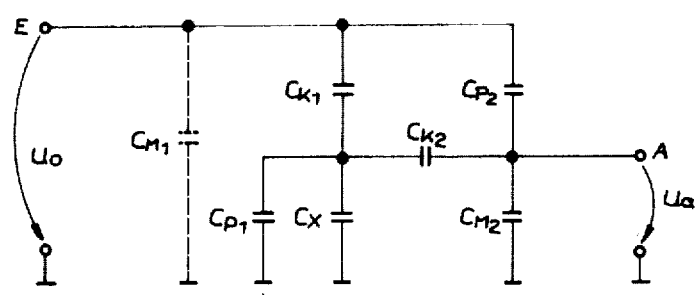
FIG. 3 is a schematic diagram of a capacitive model of the invention.

Operation of the capacitive measuring sensor is best explained with the aid of the schematic diagram FIG. 3. The following capacitances exist:

capacitance $C_{k1}$, between first electrode 4 and coupling pin 6;

capacitance $C_{k2}$, between coupling pin 6 and second electrode 5;

capacitance $C_x$, between coupling pin 6 and conductive material 2, which latter is grounded;

parasitic capacitance $C_{p1}$, between coupling pin 6 and grounded shield 3, $C_{p1}$ being small by design;

parasitic capacitance $C_{p2}$, between first and second electrodes 4 and 5, $C_{p2}$ being likewise small by design;

capacitance $C_{M1}$ between shield 3 and first electrode 4; and capacitance $C_{M2}$, between shield 3 and second electrode 5, and including the input capacitance of amplifier element 9.

The capacitance $C_{M1}$ however will not distort the results of measuring, but will be observed merely as a load imposed upon the alternating voltage of supply $U_o$. The capacitance $C_{M1}$ is, therefore, indicated in FIG. 3 by a dashed line.

Applying the alternative voltage of supply $U_v$ to the input E, the voltage will divide itself across the capacitances of the capacitive measuring sensor 1.

By the decoupling projection 10, the parasitic capacitance $C_{p2}$ becomes of a negligible small magnitude. Thus, the output voltage $U_a$ will, dependent upon the distance $d_1$ to be measured, be $$U_a = U_o \cdot \frac{C_{k1}}{C_{M2}} \cdot \frac{1}{1 + \frac{C_{k1}}{\frac{C_{M2} C_{k2}}{C_{M2} + C_{k2}} + C_{p1} + C_x(d_1)}}$$

It is a further objective, to keep the parasitic capacitance $C_{p1}$ small by means of special design of the construction, since suppression of the actual measuring effect is caused by the influence of $C_{p1}$.

The variable capacitance is $C_x$, defined by the variable distance between measuring surface 7 and conductive material 2.

We claim:

1. A capacitance sensor for measuring capacitance between itself and a conductive material and thereby measuring a distance therebetween, comprising:
   a coupling pin with a measuring surface at a lower end thereof;
   a first electrode surrounding a part of the coupling pin and being spaced therefrom;
   a second electrode located above and adjacent to the coupling pin and being spaced therefrom;
   an amplifier with an input connected to the second electrode;
   a hollow and grounded shield with an open bottom and a closed top, the shield containing the first and second electrodes and a part of the coupling pin in a manner that the first electrode is flush with the bottom of the shield and the measuring surfaces of the coupling pin is adjacent said bottom;
   a first dielectric layer separating the first electrode from the shield;
   a second dielectric layer separating the second electrode from the shield;
   an input line connected only to the first electrode; and
   an output line connected only to an output of the amplifier.

2. The capacitance sensor defined by claim 1, wherein the first and second dielectric layers are of a material having a low dielectric constant.

3. The capacitance sensor defined by claim 1, further including a third dielectric layer separating the first electrode from the coupling pin.

4. The capacitance sensor defined by claim 3, wherein the first, second and third dielectric layers are of a material having a low dielectric constant.

5. The capacitance sensor defined by claim 1, wherein the amplifier element is a field effect transistor having a source, a drain and a gate, and wherein the source is connected to the shield, wherein the drain is connected to the output line, and wherein the gate is connected to the second electrode.

6. The capacitance sensor defined by claim 1, wherein the shield has a decoupling projection located intermediate the first and second electrodes.

7. The capacitance sensor defined by claim 1, wherein the measuring surface projects below said bottom of the shield.

* * * * *